US012682120B2

(12) United States Patent
Kim et al.

(10) Patent No.: US 12,682,120 B2
(45) Date of Patent: Jul. 14, 2026

(54) APPARATUS AND METHOD FOR OBFUSCATION

(71) Applicant: 78Researchlab Inc., Seoul (KR)

(72) Inventors: Kyungdong Kim, Seoul (KR); Sungyup Nam, Seoul (KR)

(73) Assignee: 78Researchlab Inc., Seoul (KR)

( * ) Notice: Subject to any disclaimer, the term of this patent is extended or adjusted under 35 U.S.C. 154(b) by 22 days.

(21) Appl. No.: 18/817,633

(22) Filed: Aug. 28, 2024

(65) Prior Publication Data

US 2024/0419843 A1 Dec. 19, 2024

Related U.S. Application Data

(63) Continuation of application No. PCT/KR2023/016982, filed on Oct. 30, 2023.

(30) Foreign Application Priority Data

Dec. 12, 2022 (KR) ........................ 10-2022-0172597

(51) Int. Cl.
G06F 21/00 (2013.01)
G06F 21/54 (2013.01)
G06F 21/64 (2013.01)

(52) U.S. Cl.
CPC .............. *G06F 21/64* (2013.01); *G06F 21/54* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 7,620,987 B2 * | 11/2009 | Shelest | ................. | G06F 21/566 |
| | | | | 713/189 |
| 8,984,299 B1 * | 3/2015 | Yi | ........................... | G06F 21/14 |
| | | | | 713/189 |
| 9,116,712 B2 * | 8/2015 | Miller | ....................... | G06F 8/70 |
| 2012/0221864 A1 * | 8/2012 | Ciet | ...................... | G06F 21/577 |
| | | | | 713/190 |
| 2016/0299765 A1 | 10/2016 | Wesie et al. | | |

(Continued)

FOREIGN PATENT DOCUMENTS

| | | |
|---|---|---|
| KR | 10-2018-0019515 A | 2/2018 |
| KR | 10-2018-0036916 A | 4/2018 |

(Continued)

*Primary Examiner* — Maung T Lwin

(74) *Attorney, Agent, or Firm* — Bridgeway IP Law Group, PLLC; Jihun Kim

(57) ABSTRACT

Proposed are an apparatus and method for obfuscating a smart contract. The apparatus for obfuscating a smart contract includes: memory; and a controller configured to, when obtaining a first smart contract, generate a second smart contract by obfuscating at least part of the first smart contract, to generate a third smart contract based on the first smart contract, and to register the second and third smart contracts on a blockchain network. Meanwhile, the embodiments disclosed herein are the technology developed through "BlueBears: Enhanced Security Armor Service for Robust Smart-contract" of the 2023 Fintech Blockchain Technology Commercialization Support Project (FB230059) sponsored by the Seoul Business Agency of the Seoul Metropolitan Government.

14 Claims, 4 Drawing Sheets

(56)     References Cited

U.S. PATENT DOCUMENTS

| | | | |
|---|---|---|---|
| 2016/0350749 | A1 | 12/2016 | Wilkins et al. |
| 2020/0287708 | A1* | 9/2020 | Iwama .................. H04L 9/3242 |
| 2021/0342131 | A1* | 11/2021 | Liu .......................... G06F 21/64 |
| 2023/0086191 | A1* | 3/2023 | Jakobsson ............. H04L 9/3231 |
| | | | 705/66 |
| 2023/0368185 | A1* | 11/2023 | Padmanabhan .... G06Q 20/3672 |

FOREIGN PATENT DOCUMENTS

| | | | |
|---|---|---|---|
| KR | 10-2019-0000578 | A | 1/2019 |
| KR | 10-1954268 | B1 | 3/2019 |
| KR | 10-2008001 | B1 | 8/2019 |
| KR | 10-1989450 | B1 | 9/2019 |
| KR | 10-2105020 | B1 | 4/2020 |
| KR | 10-2020-0115902 | A | 10/2020 |
| KR | 10-2021-0048241 | A | 5/2021 |
| KR | 10-2529826 | B1 | 5/2023 |

* cited by examiner

200

APPARATUS AND METHOD FOR OBFUSCATION

CROSS-REFERENCE TO RELATED APPLICATION

This application is a continuation application of the International Application No. PCT/KR2023/016982, filed on Oct. 30, 2023, which claims priority from Korean Patent Application No. 10-2022-0172597, filed on Dec. 12, 2022, which is also incorporated herein by reference in its entirety.

TECHNICAL FIELD

The embodiments disclosed herein relate to an apparatus and method for obfuscation, and more specifically to an apparatus and method for obfuscating a smart contract.

BACKGROUND ART

Recently, blockchain technology has become popularized. Blockchain technology is a distributed ledger technology that has a systematic feature in which once information has been stored, it is copied to all nodes and integrity is provided. Smart contracts, which are contracts concluded based on such blockchains, are also becoming popularized.

Meanwhile, blockchains are intended to enable transactions between parties, for example, without a credible third-party guarantee, in the state of making all transaction information publicly available for anyone to view. Accordingly, even when a service developer does not directly disclose the code of a smart contract, the source code may be immediately obtained by decompiling a byte code within an on-chain scan service. Due to this characteristic, hackers may freely identify the security vulnerabilities of smart contracts, and hacking incidents are constantly occurring accordingly.

Meanwhile, hacking is also occurring in DeFi services. When a service on a blockchain is hacked, significant economic damage occurs and users' trust is significantly reduced. Accordingly, when a hacking incident occurs even once, it is difficult to continue providing the service.

Accordingly, although some services do not disclose their codes to prevent the hacking of services on blockchains, the nondisclosure of codes goes against the purpose of blockchains.

Meanwhile, a virtual machine that processes a byte code in a blockchain is a non-von Neumann machine. Accordingly, it is difficult to apply a conventional obfuscation technique (i.e. a technique that dynamically modifies execution codes) that targets sources or binaries developed in languages such as JavaScript, Java, C, and C++, to blockchains.

In connection with this, Korean Patent No. 10-1954268, which is a related art document, is directed to a blockchain-based document management method. This document discloses only a technology in which, when a document registration request transaction is obtained from a document management server in response to a document registration request from a document writer terminal, a document management support server checks whether the document registration request transaction is valid, and executes a document generation smart contract when it is valid. However, this method does not take into consideration security regarding a smart contract. Therefore, there is a demand for a new level of function for protecting a smart contract from hacking.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

In contrast, the embodiments disclosed herein are the technology developed through "BlueBears: Enhanced Security Armor Service for Robust Smart-contract" of the 2023 Fintech Blockchain Technology Commercialization Support Project (FB230059) sponsored by the Seoul Business Agency of the Seoul Metropolitan Government.

DISCLOSURE

Technical Problem

An object of the disclosed embodiments is to propose an apparatus and method for obfuscating a smart contract.

An object of the disclosed embodiments is to propose an apparatus and method for obfuscation that may enable the obfuscation of a smart contract with minimal resources.

An object of the disclosed embodiments is to propose an apparatus and method for obfuscation that may increase the opportunity cost required for analyzing a smart contract.

Technical Solution

As a technical solution for achieving the above-described object, there is provided an apparatus for obfuscating a smart contract, the apparatus including: memory; and a controller configured to, when obtaining a first smart contract, generate a second smart contract by obfuscating at least part of the first smart contract, to generate a third smart contract based on the first smart contract, and to register the second and third smart contracts on a blockchain network.

According to another embodiment, there is provided a method for obfuscation performed by an apparatus for obfuscation to obfuscate a smart contract, the method including: obtaining a first smart contract; generating a second smart contract by obfuscating at least part of the first smart contract, and generating a third smart contract based on the first smart contract; and registering the second and third smart contracts on a blockchain network.

According to still another embodiment, there is provided a computer-readable storage medium having recorded thereon a program for performing a method for obfuscation, wherein the method includes: obtaining a first smart contract; generating a second smart contract by obfuscating at least part of the first smart contract, and generating a third smart contract based on the first smart contract; and registering the second and third smart contracts on a blockchain network.

According to still another embodiment, there is provided a computer program performed by an apparatus for obfuscation and stored in a medium to perform a method for obfuscation, wherein the method includes: obtaining a first smart contract; generating a second smart contract by obfuscating at least part of the first smart contract, and generating a third smart contract based on the first smart contract; and registering the second and third smart contracts on a blockchain network.

Advantageous Effects

According to one of the above-described technical solutions, there may be proposed the apparatus and method for obfuscating a smart contract.

Furthermore, according to one of the above-described technical solutions, there may be proposed the apparatus and method for obfuscation that may enable the obfuscation of a smart contract with minimal resources.

Moreover, according to one of the above-described technical solutions, there may be proposed the apparatus and method for obfuscation that may increase the opportunity cost required for analyzing a smart contract. Therefore, it may be possible to induce a hacker to give up hacking into a smart contract to be protected and attempt hacking into another target (e.g., an un-obfuscated service).

The effects that can be obtained by the embodiments disclosed herein are not limited to the above-described effects, and other effects that have not been described above will be clearly understood by those having ordinary skill in the art, to which the disclosed embodiments pertain, from the following description.

MODE FOR INVENTION

Figure 1:
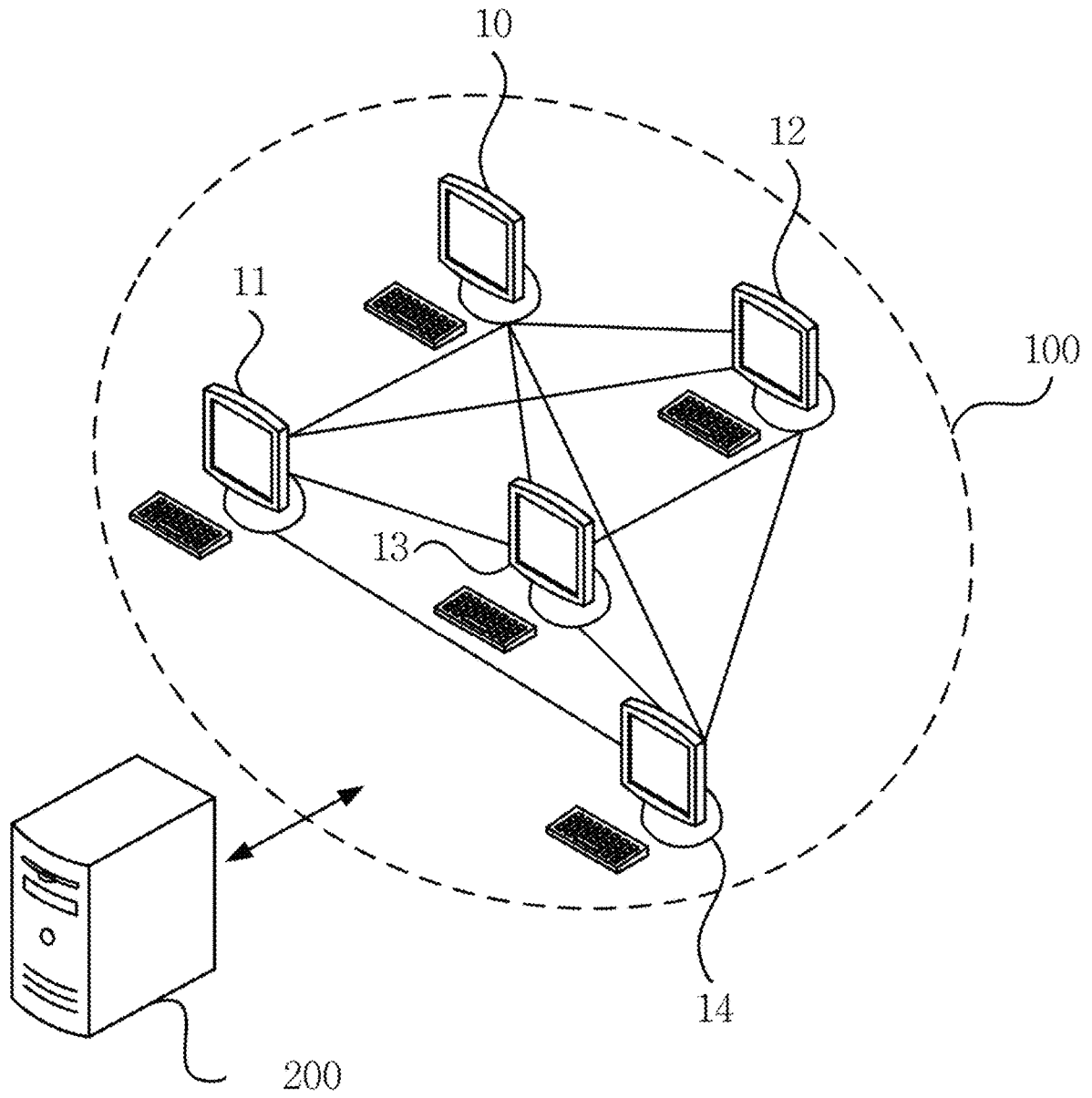
FIG. 1 is a block diagram illustrating a smart contract system according to an embodiment of the present invention.

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is 'directly connected' to the other component but also a case where the one component is 'connected to the other component with a third component arranged therebetween.' Furthermore, when one portion is described as "including" one component, this does not mean that the portion does not exclude another component but means that the portion may further include another component, unless explicitly described to the contrary.

Embodiments will be described in detail below with reference to the accompanying drawings.

Meanwhile, prior to the following description, the meanings of the terms to be used below will be defined first.

In the present specification, the blockchain may refer to a distributed Peer-to-Peer (P2P) system for a ledger that utilizes software elements composed of algorithms by which blocks that are sequentially connected to secure and maintain integrity negotiate transaction information by using encryption and security technologies. In this case, the distributed P2P system may be a special type of distributed system. Furthermore, the P2P system enables all the nodes of a network to provide resources (processing power, storage space, data or network bandwidth, and/or the like) to each other without the coordination of a central node. Moreover, the blockchain may refer to a distributed ledger technology that enables a ledger, in which transaction information is recorded, to be distributed across a P2P network rather than being stored in the central server of a specific institution and also enables nodes within the network to record and manage the ledger jointly.

In the present specification, the node may refer to a component within a blockchain network, and a peer may be used as a term having the same meaning as a node. For example, the node may be, but is not limited to, a special-purpose computer, a general-purpose computer, a supercomputer, a mainframe computer, a personal computer (PC), a smartphone, a tablet PC, or the like.

In the present specification, a smart contract is a program that automatically executes a contract when a condition is met and is registered on a blockchain. It is used in various contracts such as contracts for financial transactions.

In addition to the terms defined above, terms that require descriptions will be described separately below.

Terms including ordinal numbers such as first, second, etc. may be used to describe various components, but the components are not limited by the terms. These terms are each used only for the purpose of distinguishing one component from another.

FIG. 1 is a block diagram illustrating a smart contract system, including a blockchain network and an apparatus for obfuscation, according to an embodiment of the present invention.

As shown in FIG. 1, the smart contract system may include a blockchain network 100 and an apparatus 200 for obfuscation.

The blockchain network 100 includes a plurality of nodes 10, 11, 12, 13, and 14, which are connected to each other and manage data in a distributed manner. For example, the blockchain network 100 may store the program code of a smart contract. Furthermore, for example, the blockchain network 100 may store a smart contract or the like obfuscated through the apparatus 200 for obfuscation. The smart contract may be shared in the form of blocks through the blockchain network 100. For example, the smart contract may be a computer protocol that facilitates, verifies, or executes the settlement or performance of a transaction. Accordingly, the smart contract may be formatted as an executable script or another type of computing function so that one or more predetermined operations are performed when the contract is executed by an appropriate processor. The smart contract may be configured such that the plurality of nodes 10, 11, 12, 13, and 14 may be connected to each other and store data and may perform respective related operations when the condition of the smart contract is met or not met (e.g., when a breach of a contract condition occurs).

The apparatus 200 for obfuscation may communicate with a supplier apparatus (not shown) that generates and supplies a smart contract, or may be included in the supplier apparatus (not shown) or include the supplier apparatus (not shown). The supplier apparatus (not shown) may be a service provider that develops or distributes a smart contract. The apparatus 200 for obfuscation may obfuscate a smart contract obtained from the supplier apparatus (not shown) and register it on the blockchain network 100.

Figure 2:
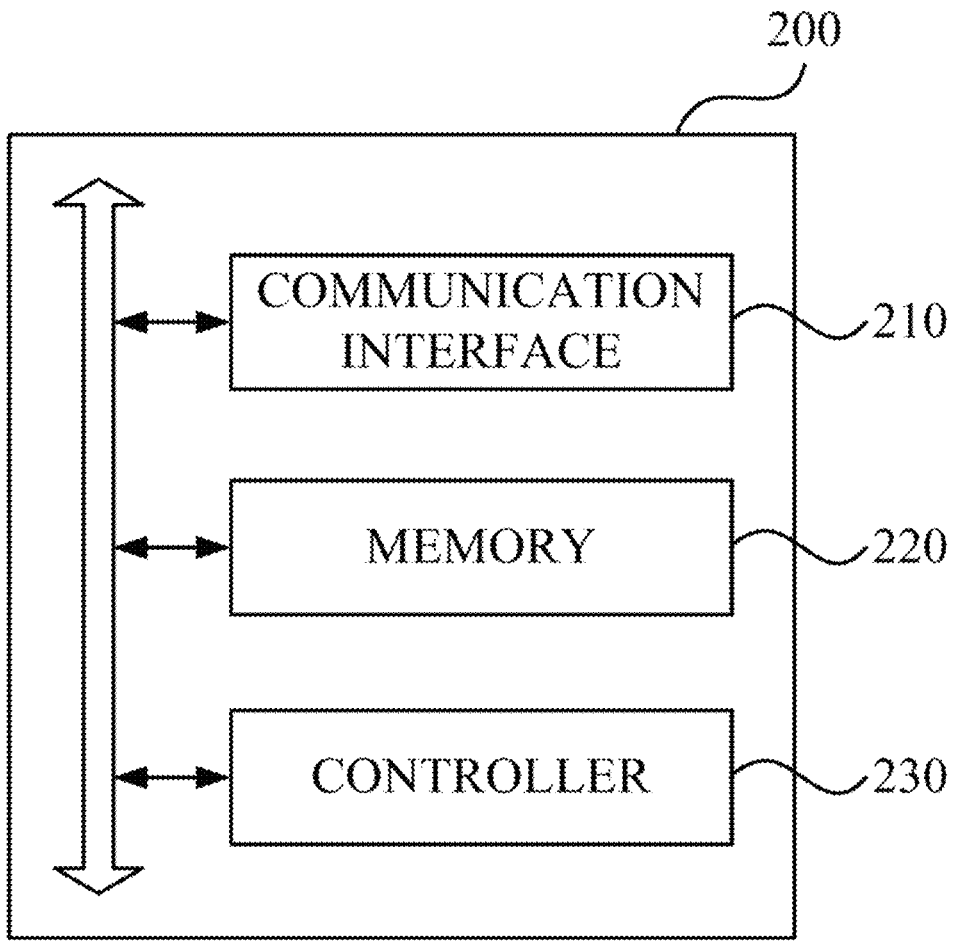
FIG. 2 is a block diagram illustrating an apparatus for obfuscation according to an embodiment.

FIG. 2 is a block diagram illustrating an apparatus for obfuscation according to an embodiment.

Referring to FIG. 2, an apparatus 200 for obfuscation according to an embodiment may include a communication interface 210, memory 220, and a controller 230.

The communication interface 210 may perform wired or wireless communication with another electronic terminal or a network. In this case, the electronic terminal may be implemented as a computer, a mobile terminal, a television, a wearable device, or the like that can access a remote server over a network or connect with another terminal and a server. In this case, the computer includes, e.g., a notebook, a desktop, a laptop, and the like each equipped with a web browser. The mobile terminal is, e.g., a wireless communication device capable of guaranteeing portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, a Mobile Worldwide Interoperability for Microwave Access (mobile WiMAX) terminal, and the like. Furthermore, the television may include an Internet Protocol Television (IPTV), an Internet Television (Internet TV), a terrestrial TV, a cable TV, and the like. Moreover, the wearable device is an information processing device of a type that can be directly worn on a human body, such as a watch, glasses, an accessory, clothing, shoes, or the like, and can access a remote server or be connected to another terminal directly or via another information processing device over a network.

To perform communication, the communication interface 210 may include a communication module that supports at least one of various wired/wireless communication methods. For example, the communication module may be implemented in a chipset form. The wireless communication supported by the communication interface 210 may be, e.g., Wireless Fidelity (Wi-Fi), Wi-Fi Direct, Bluetooth, Ultra-Wide Band (UWB), Near Field Communication (NFC), or the like. Furthermore, the wired communication supported by the communication interface 210 may be, e.g., Universal Serial Bus (USB), High Definition Multimedia Interface (HDMI), or the like.

According to an embodiment, the controller 230 to be described later may obtain a first smart contract through the communication interface 210. Furthermore, according to an embodiment, the controller 230 to be described later may receive an obfuscation request for the first smart contract through the communication interface 210.

Meanwhile, various types of data such as files, applications, and programs may be installed and stored in the memory 220. The controller 230 to be described later may access and use the data stored in the memory 220, or may store new data in the memory 220. Furthermore, the controller 230 may execute a program installed in the memory 220. For example, the memory 220 may have a program for performing a method for obfuscation installed therein, and may store an original smart contract prior to obfuscation when necessary.

Meanwhile, according to an embodiment, the controller 230 may control the overall operation of the apparatus 200 for obfuscation, and may include a processor such as a CPU, a GPU, or the like. For example, the controller 230 may control other components, included in the apparatus 200 for obfuscation, to perform an obfuscation operation for a smart contract upon receiving an obfuscation request through the communication interface 210. Furthermore, for example, the controller 230 may execute a program stored in the memory 220, may read a file stored in the memory 220, or may store a new file in the memory 220.

The controller 230 obtains the first smart contract. That is, the controller 230 may obtain the first smart contract, which is a target of protection and is a target of obfuscation according to an embodiment described in the present specification.

In addition, the controller 230 may generate a second smart contract by obfuscating at least part of the first smart contract, and may generate a third smart contract based on the first smart contract.

The controller 230 may generate the second smart contract by obfuscating at least part of the first smart contract.

According to an embodiment, the controller 230 may generate the second smart contract by obfuscating at least part of a source code corresponding to the first smart contract.

To this end, the controller 230 may analyze the source code of the first smart contract, may identify the location of an obfuscation target, may apply an obfuscation technique to each obfuscation target location at least once, and may check whether compilation has been performed whenever the obfuscation technique is applied and roll back an obfuscated part that causes an error.

For example, the controller 230 may parse a source code by analyzing the source code written in solidity and generating an abstract syntax tree (AST), and may identify the locations of one or more obfuscation targets in the source code for each obfuscation technique based on the source code and the AST and list them. That is, the controller 230 may generate JSON format AST information, may identify a variable declaration statement through a variable name and "name" within the AST information, may determine the character in a current code from which the corresponding declaration statement starts through "src" and parse the source code, and may identify the location of an obfuscation target in the parsed source code. The controller 230 may perform obfuscation for each source code at the identified location. For example, the controller 230 may perform obfuscation for each declaration statement or function. In this case, the controller 230 may check whether compilation has been performed whenever an obfuscation technique is applied, and may roll back an obfuscated part that causes an error. Accordingly, for example, whenever an obfuscation technique is applied to each location, or whenever a different obfuscation technique is applied to the same location, whether compilation has been performed may be checked and a location where an error occurs may be rolled back to a state prior to obfuscation. In connection with this, the obfuscation technique includes, e.g., a name change obfuscation technique that obfuscates a variable to appear as an address and a code flow obfuscation technique that uses or inserts a random and unexpected syntax, but are not limited to the examples described above.

Furthermore, the controller 230 may extract some source codes from the source code of the first smart contract and convert them into functions. For example, the controller 230 may identify source codes related to a formula and a constant value in the source code by analyzing the source code of the first smart contract, and may also identify source codes related to an address calculation part, a main token generation part, and a token burning part. The controller 230 may extract the identified source codes related to a formula, a constant value, an address calculation part, a main token generation part, and a token burning part, convert the identified source codes into functions, and insert the corresponding functions into locations corresponding to the extracted source codes, thereby generating a third smart contract including the extracted source codes. For example, the controller 230 may identify and extract a formula part as a function declared as public (or private) and generate a third smart contract with the extracted formula. Accordingly, when the first smart contract or the second smart contract is executed, the third smart contract may be called when the function related to the formula extracted as the third smart contract is called.

According to another embodiment, the controller 230 may generate the second smart contract by obfuscating at least part of a byte code obtained by compiling the first smart contract.

For example, the controller 230 may compile the first smart contract and obfuscate at least part of a compiled byte code.

Furthermore, for example, the controller 230 may obfuscate at least part of a source code corresponding to the first smart contract, may compile the obfuscated source code, and may obfuscate at least part of a compiled byte code.

In order to obfuscate a byte code, the controller 230 may analyze the byte code in a disassemble and control flow graph (CFG) form, may identify points for execution flow obfuscation (e.g., function start points), and may manage them in a list form. In this case, the byte length may change as the obfuscation of the byte code is performed, so that an obfuscation code space for the insertion of an obfuscation code may be secured in advance and a JUMP address value may also be changed in advance due to a change in offset value caused by the change in length. Furthermore, the controller 230 may generate a machine language instruction and insert it into the obfuscation code space. For example, a sole compiler generally generates local function calls as PUSHI, JUMPI Ethereum Virtual Machine (EVM) byte codes, which may be composed of semantically identical but different EVM machine language instructions in complicated forms. This may make it difficult for decompilers and reverse engineering tools that can only process existing PUSHI, JUMPI call structures to interpret the corresponding instructions. That is, the controller 230 may generate the instruction described in the right cell by obfuscating the instruction described in the left cell in Table 1 below, and the EVM may execute the instructions in the left and right cells in the same manner. As described above, the controller 230 may obfuscate the byte code by inserting a code configured to complicate an execution flow into the obfuscation code space.

TABLE 1

| | |
|---|---|
| pushi 46 | mstore 46 |
| jumpi | mload |
| | jumpi |

As described above, the controller 230 may generate the second smart contract by obfuscating the first smart contract. In addition, the controller 230 may upload the second smart contract to the blockchain network.

Meanwhile, the controller 230 may generate the third smart contract by extracting part of the first smart contract.

According to an embodiment, the controller 230 may extract part of the first smart contract and generate the third smart contract that is called when the second smart contract is executed. For example, the controller 230 may extract a code that can be executed when a hacker analyzes the second smart contract at a source code and byte level, and the controller generate the extracted code as the third smart contract, thereby executing it in the third smart contract rather than executing it in the second smart contract.

Furthermore, according to an embodiment, the controller 230 may extract part of the first smart contract and generate the third smart contract that is called when the second smart contract is executed. In this case, the third smart contract is executed. In this case, the third smart contract may be generated by obfuscating the source code extracted from the source code of the first smart contract. The controller 230 may roll back an obfuscated part causing an error by compiling a source code extracted from the source code of the first smart contract when obfuscating the source code. Since the third smart contract is also obfuscated, a hacker may have difficulty in analyzing the third smart contract because he or she needs to additionally analyze the third smart contract when analyzing the second smart contract.

The controller 230 may generate the third smart contract by extracting part of the source code of the first smart contract. In this case, the source code extracted from the source code of the first smart contract may be converted into a function and the function corresponding to the extracted source code may be inserted into the location of the extracted source code. The extracted source code may be implemented as the third smart contract, and may be called using a proxy contract. In other words, when the function corresponding to the extracted part is called, the proxy contract may be called, and a fallback function included in the proxy contract may be called. In connection with this, the fallback function is a function that operates as a default for an undefined situation or case, and may include delegatecall( ). delegatecall( ) is a function that calls the third smart contract while maintaining an environment including all variables to which the program of a proxy contract can refer when the program is executed in a situation in which the proxy contract calls the third smart contract. Accordingly, when the function of the extracted part is executed, the third smart contract containing a necessary formula is called through the proxy contract, and a change to it may be stored in the proxy contract. Therefore, when the third smart contract is updated and distributed, a contract transaction address value used in delegatecall( ) of the proxy contract is changed to a newly distributed contract address, and an updated third smart contract is called. As a result, the third smart contract in which obfuscation has continuously been updated is called during the process in which a hacker analyzes the second smart contract (or the first smart contract), thus making it difficult to analyze the main functions of the second smart contract (or the first smart contract).

Hereinafter, for convenience of description, the updated third smart contract is referred to as a fourth smart contract. That is, the controller 230 may generate the fourth smart contract based on the third smart contract and register the fourth smart contract on a blockchain network. That is, the controller 230 may generate the fourth smart contract by obfuscating the third smart contract. For example, the controller 230 may generate the fourth smart contract by obfuscating the third smart contract by adding a random formula thereto. The fourth smart contract, which is the updated third smart contract, may be called instead of the third smart contract when the second smart contract is executed later. Thereafter, the fourth smart contract may be additionally obfuscated and updated to another smart contract. Whenever it is updated, the second smart contract may dynamically and repeatedly obfuscate main functions in the smart contract by calling the updated contract. For example, the controller 230 may generate a new contract by updating the most recent contract, among the contracts called by the second smart contract, at each predetermined period, and may register the generated contract on the blockchain so that it can be called by the second smart contract. The contract may be updated periodically, or may be updated at each period set by the controller 230. For example, the period may be shortened in inverse proportion to the number of executions of a corresponding contract. Therefore, when the number of executions is smaller than a predetermined threshold, a corresponding contract may be updated every 30 minutes. In contrast, when it is equal to or larger than the predetermined threshold, a corresponding contract may be updated every hour.

When the second smart contract registered on the blockchain is executed, the third smart contract, which has frequently used main functions, such as an address calculation part, a main token generation part, and a token burning part frequently used in the smart contract, in the form of a library, may be called and executed. As the main functions of the third smart contract are continuously updated, the smart contract may be dynamically updated. This is differentiated from the existing PC and Android APK obfuscation software in which only one-time obfuscation technology is present.

As described above, the resources required for the analysis of a smart contract may be further increased by obfuscating the first smart contract and registering the obfuscated smart contract in multiple bundles (e.g., the second and third smart contracts) on the blockchain network. This may discourage hackers from hacking the corresponding smart contract.

Figure 3:
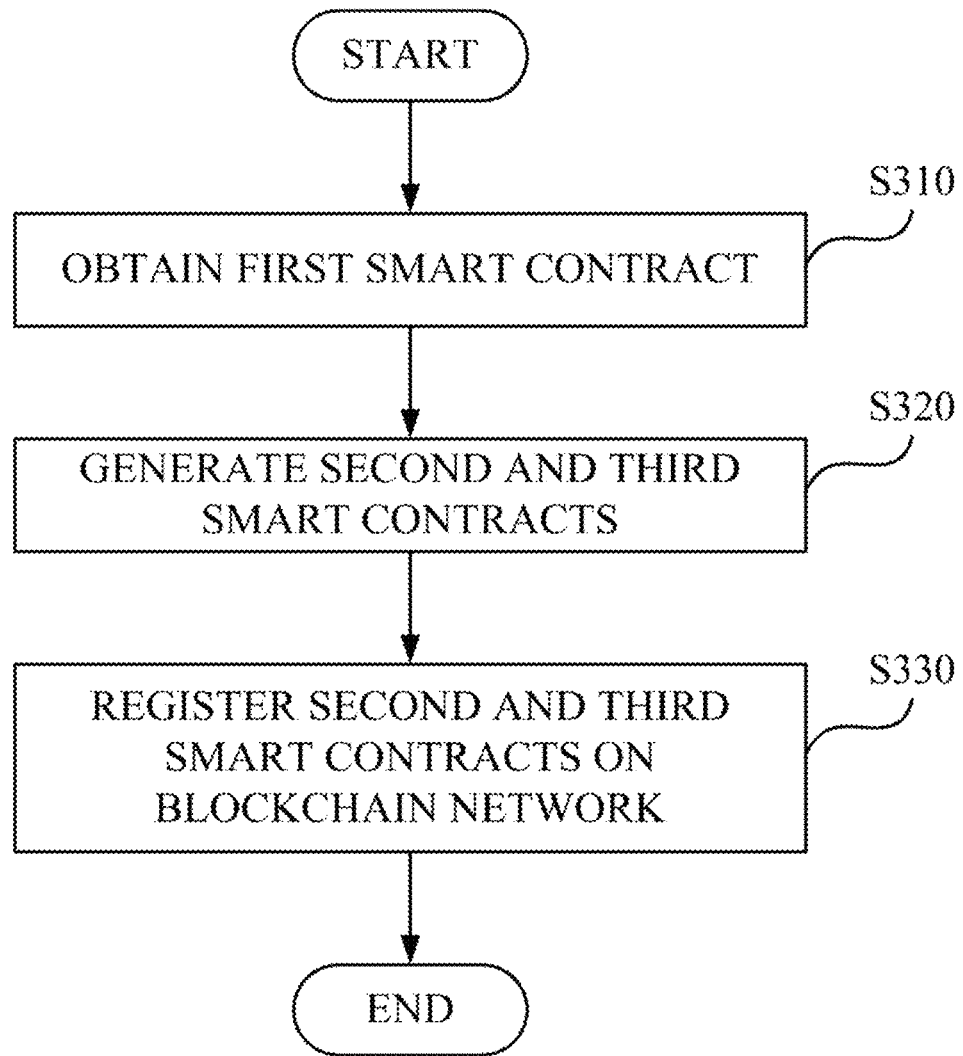
FIGS. 3 and 4 are flowcharts illustrating a method for obfuscation according to an embodiment.
Figure 4:
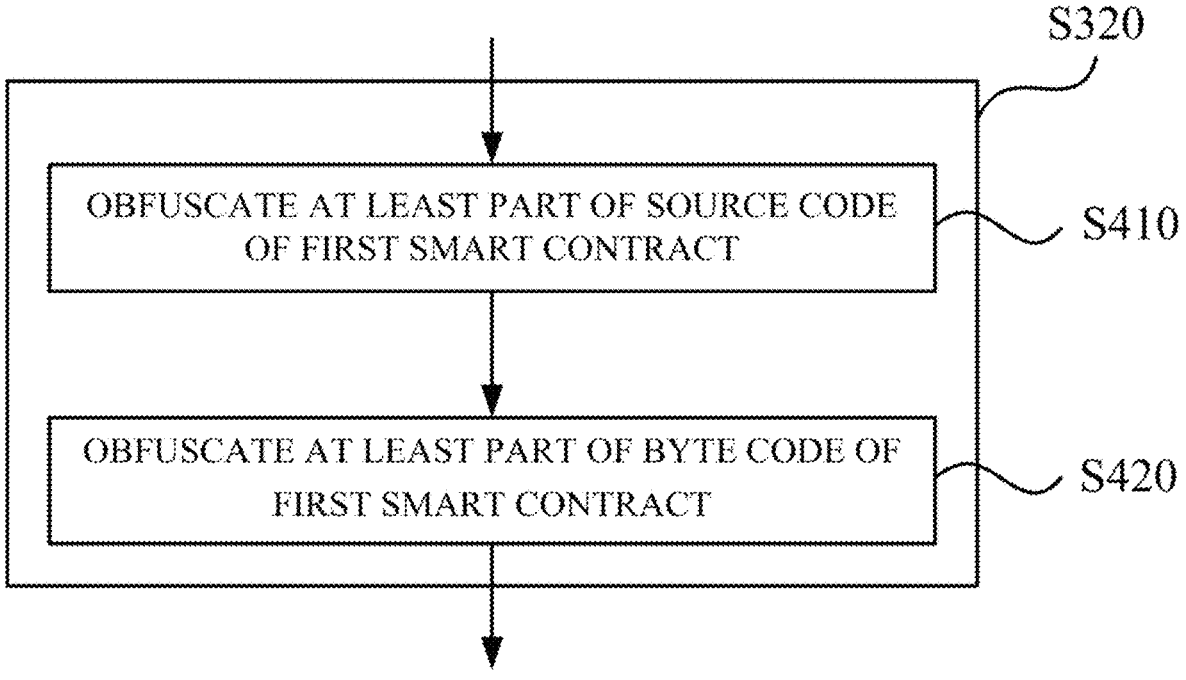

Meanwhile, FIGS. 3 and 4 are flowcharts illustrating a method for obfuscation according to an embodiment.

The method for obfuscation according to the embodiment shown in FIGS. 3 and 4 includes steps that are processed in a time-series manner in the apparatus 200 for obfuscation shown in FIGS. 1 and 2. Accordingly, the descriptions that are omitted below but have been given above in conjunction with the apparatus 200 for obfuscation shown in FIGS. 1 and 2 may also be applied to the method for obfuscation according to the embodiment shown in FIGS. 3 and 4.

As shown in FIG. 3, the apparatus 200 for obfuscation may obtain a first smart contract in step S310.

Thereafter, the apparatus 200 for obfuscation may generate a second smart contract and a third smart contract in step S320.

That is, the apparatus 200 for obfuscation may generate the second smart contract by obfuscating at least part of the first smart contract, and may generate the third smart contract based on the first smart contract.

In connection with this, as shown in FIG. 4, the apparatus 200 for obfuscation may generate the second smart contract by obfuscating at least part of a source code corresponding to the first smart contract in step S410.

In this case, the apparatus 200 for obfuscation may extract and generate part of the first smart contract, and may generate the third smart contract that is called when the second smart contract is executed.

In addition, the apparatus 200 for obfuscation may obfuscate at least part of a source code corresponding to the first smart contract and obfuscate at least part of a byte code obtained by compiling the obfuscated source code, thereby generating the second smart contract in step S420.

The apparatus 200 for obfuscation may register the second and third smart contracts, generated as described above, on a blockchain network in step S330.

Thereafter, the apparatus 200 for obfuscation may generate a fourth smart contract based on the third smart contract. For example, the apparatus 200 for obfuscation may generate the fourth smart contract by obfuscating the third smart contract. That is, the apparatus 200 for obfuscation may generate the fourth smart contract that is called instead of the third smart contract when the second smart contract is executed. In addition, the apparatus 200 for obfuscation may register the fourth smart contract on the blockchain network. Thereafter, the apparatus 200 for obfuscation may repeatedly update the contract that is called when the second smart contract is called. That is, a new contract may be generated by obfuscating a previous contract, and the generated contract may be called.

According to the above description, the method for obfuscation may be provided in a plug-in form, thereby improving the convenience of use for developers.

According to the apparatus and method for obfuscation according to the embodiments disclosed in the present specification, a smart contract may be made complex and difficult to analyze as much as possible, thereby causing hackers to spend a lot of time and effort on analyzing the corresponding smart contract, thereby discouraging them from analyzing the corresponding smart contract.

The term "unit" used in the above-described embodiments means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

The functions provided in components and "unit(s)" may be combined into a smaller number of components and "unit(s)" or divided into a larger number of components and "unit(s)."

In addition, components and "unit(s)" may be implemented to run one or more central processing units (CPUs) in a device or secure multimedia card.

The method for obfuscation according to the embodiment may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method for obfuscation according to the embodiment may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method for obfuscation according to the embodiment may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

The invention claimed is:

1. An apparatus for smart contract obfuscation, the apparatus comprising:

a memory to store a program for performing a smart contract obfuscation method; and

a controller comprising at least one processor configured to execute instructions stored in the memory to:

obtain a first smart contract;

parse a Solidity source code of the first smart contract to generate an abstract syntax tree (AST) in a machine-readable format, identify locations of obfuscation targets including variables, functions, and expressions based on the AST, apply at least one of name-based obfuscation and control-flow obfuscation to the identified locations while automatically compiling the first smart contract and rolling back an obfuscation causing a compilation error, thereby generating a second smart contract by obfuscating at least part of the first smart contract;

extract execution-related source codes from the first smart contract, convert the extracted execution-related source codes into callable functions, and generate a third smart contract configured to be invoked by the second smart contract during execution; and register the second smart contract and the third smart contract on a blockchain network.

2. The apparatus of claim 1, wherein the controller generates the second smart contract by obfuscating at least part of a source code corresponding to the first smart contract.

3. The apparatus of claim 1, wherein the controller generates the second smart contract by obfuscating at least part of a byte code obtained by compiling the first smart contract.

4. The apparatus of claim 1, wherein the controller generates the second smart contract by obfuscating at least part of a source code corresponding to the first smart contract and obfuscating at least part of a byte code obtained by compiling the obfuscated source code.

5. The apparatus of claim 1, wherein the controller generates a third smart contract by extracting part of the first smart contract, the controller generating the third smart contract that is called when the second smart contract is executed.

6. The apparatus of claim 1, wherein the controller extracts part of a source code of the first smart contract, and inserts a function corresponding to the extracted source code into a location at which the source code has been extracted.

7. The apparatus of claim 1, wherein the controller generates a fourth smart contract based on the third smart contract and registers the fourth smart contract on the blockchain network, the controller generating the fourth smart contract that is called instead of the third smart contract when the second smart contract is executed.

8. The apparatus of claim 7, wherein the controller generates the fourth smart contract by adding a random formula to the third smart contract.

9. A method for smart contract obfuscation, the method comprising:

obtaining a first smart contract;

parsing a Solidity source code of the first smart contract to generate an abstract syntax tree (AST) in a machine-readable format, identifying locations of obfuscation targets including variables, functions, and expressions based on the AST, and applying at least one of name-based obfuscation and control-flow obfuscation to the identified locations while automatically compiling the first smart contract and rolling back an obfuscation causing a compilation error, thereby generating a second smart contract by obfuscating at least part of the first smart contract;

extracting execution-related source codes from the first smart contract, converting the extracted execution-related source codes into callable functions, and generating a third smart contract configured to be invoked by the second smart contract during execution; and registering the second smart contract and the third smart contract on a blockchain network.

10. The method of claim 9, wherein generating the second smart contract comprises generating the second smart contract by obfuscating at least part of a source code corresponding to the first smart contract.

11. The method of claim 9, wherein generating the second smart contract comprises generating the second smart contract by obfuscating at least part of a source code corresponding to the first smart contract and obfuscating at least part of a byte code obtained by compiling the obfuscated source code.

12. The method of claim 9, wherein generating the third smart contract comprises generating the third smart contract by extracting part of the first smart contract, the third smart contract being called when the second smart contract is executed.

13. The method of claim 9, wherein generating the third smart contract comprises generating a fourth smart contract based on the third smart contract and registering the fourth smart contract on the blockchain network, the fourth smart contract being called instead of the third smart contract when the second smart contract is executed.

14. A non-transitory computer-readable storage medium having stored thereon a program that, when executed by a processor, causes the processor to execute a method for smart contract obfuscation, the method comprising:

obtaining a first smart contract;

parsing a Solidity source code of the first smart contract to generate an abstract syntax tree (AST) in a machine-readable format, identifying locations of obfuscation targets including variables, functions, and expressions based on the AST, and applying at least one of name-based obfuscation and control-flow obfuscation to the identified locations while automatically compiling the first smart contract and rolling back an obfuscation causing a compilation error, thereby generating a second smart contract by obfuscating at least part of the first smart contract;

extracting execution-related source codes from the first smart contract, converting the extracted execution-related source codes into callable functions, and generating a third smart contract configured to be invoked by the second smart contract during execution; and registering the second smart contract and the third smart contract on a blockchain network.

* * * * *